United States Patent Office 3,451,746
Patented June 24, 1969

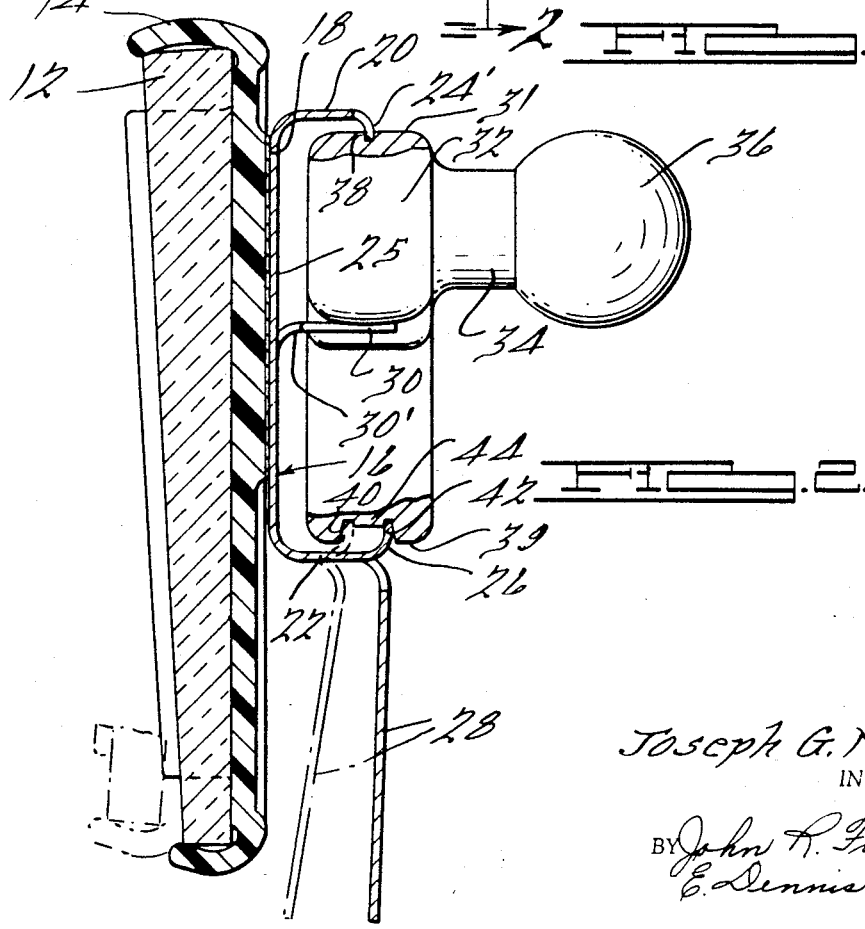

3,451,746
MULTIPLE POSITION DAY-NIGHT REAR
VIEW MIRROR ASSEMBLY
Joseph G. Madge, Dearborn, Mich., assignor to Ford Motor Company, Dearborn, Mich., a corporation of Delaware
Filed Dec. 2, 1966, Ser. No. 598,851
Int. Cl. G02b *17/00*
U.S. Cl. 350—281                             8 Claims

ABSTRACT OF THE DISCLOSURE

A multiple position rear view mirror assembly including a mirror operatively connected to a resilient, jaw-like clamp for movement therewith, said clamp gripping a mounting member, and a manually operable tab extending from said clamp for overcoming the resilient force of said clamp to adjust the gripping position of said clamp on said mounting member.

Background of the invention

It has long been known in the motor vehicle art that a wedge shaped rear view mirror may be provided with a mounting assembly that allows for a day position for normal reflective viewing, and a night position that allows the vehicle operator to observe in the mirror the area aft of his vehicle while preventing objectionable and hazardous direct reflection of the headlights of following vehicles in the eyes of the operator. This invention provides a novel rear view mirror assembly having two such positions that is of simple, reliable and economical construction and that may be assembled with ease.

Brief summary of the invention

A rear view mirror assembly constructed in accordance with this invention includes a C-shaped spring clamp, the arms of said clamp having inwardly extending hooked ends integrally formed thereon. A mirror is operatively connected to said clamp remote from the arms thereof. A mounting member extends between the arms of the clamp and has a pair of surfaces generally parallel to and adjacent said arms, one of said surfaces having formed therein a pair of substantially parallel grooves. One of said hooked ends is removably secured to one of said surfaces and the other of said hooked ends is located in one of said pair of grooves. Manually operable means extend from said clamp and deform said clamp within its elastic limit for moving said other hooked end to the other of said grooves.

Brief description of the drawing

FIGURE 1 is a rear elevational view of a rear view mirror assembly constructed in accordance with this invention, and FIGURE 2 is a partial sectional view taken along the line 2—2 of FIGURE 1.

Detailed description of the invention

Referring now to the drawing, the numeral 10 denotes a rear view mirror assembly including a wedge shaped mirror 12 mounted in a bracket 14. The bracket 14 is constructed of a flexible material such as rubber or plastic to facilitate the mounting of mirror 12, see FIGURE 2. Mirror bracket 14 is secured to a clamp, generally designated 16, by means of adhesive 18.

Clamp 16 is fabricated from a resilient material such as spring steel and has integrally formed on the extremities thereof prongs or arms 20 and 22. Arm 20 has integrally formed hook portions 24 and 24' extending substantially parallel to main body 25 of clamp 16. Arm 22 has integrally formed on its end a hook portion 26. It may thus be seen that a cross-section of spring clamp 16 is C-shaped so that clamp 16 comprises a jaw-like structure.

A manually operable adjustment tab 28 is integrally formed with arm 22 and extends substantially parallel to main body 25 of clamp 16. A pair of stabilizing locating prongs 30 and 30', integrally formed with main body 25, extend therefrom substantially parallel to arms 20 and 22.

A mounting member 32, formed in the shape of a T, as may be seen in FIGURE 1, extends between arms 20 and 22 and has an integrally formed extension 34 of reduced diameter connected to a ball 36 that may be located in a complementary socket for pivotal movement as is well known in the art. The top surface 37 of member 32 has a groove 38 formed therein that receives hook ends 24 and 24' of arm 20. Bottom surface 39 of member 32 has formed therein a pair of substantially parallel grooves 40 and 42 separated by the cut-back shoulder 44.

Hook end 26 of arm 22 is adapted to be received in either of grooves 40 or 42. FIGURE 2 illustrates end 26 extending into groove 42. Member 32 is securely gripped by clamp 16 in this position due to the spring force of the latter.

With the mirror assembly in the opsition shown in FIGURE 2, the vehicle operator may adjust the entire assembly, due to the ball and socket arrangement discussed above, for normal daytime viewing. Upon the advent of darkness, the vehicle operator may adjust the mirror assembly as will be described below to prevent objectionable glare from the lights of other vehicles approaching from the rear. This adjustment is accomplished by the vehicle operator exerting a manual force on tab 28 so that the spring force of clamp 16 is overcome and hook end 26 is withdrawn from groove 42, slid over cut-back shoulder 44 and inserted into groove 40. This position is shown in ghost in FIGURE 2. This reorientation of clamp 16 and the subsequent movement of mirror 12 is sufficient to cause the movement of mirror 12 to the nighttime driving position.

It may be seen that prongs 30 and 30' contact the cut-away portions of member 32 and aid in the locating and securing of clamp 16 relative to member 32 during both assembly of this device and adjustment of the device from the day position to the night position.

It may thus be seen that this invention provides a multiple position day-night rear view mirror that may be easily adjusted from one position to the other by the vehicle operator and that is of simple and reliable construction and design. It is to be understood that this invention is not limited to the exact embodiment shown and described above, but that various changes and modifications may be made without departing from the spirit and scope of the invention as defined by the following claims.

I claim:
1. A rear view mirror assembly comprising a C-shaped spring clamp, the arms of said C-shaped clamp having inwardly extending hook ends integrally formed thereon, a mirror, means connecting said mirror to said clamp remote from said arms, a mounting member extending between the arms of said clamp and having a pair of surfaces generally parallel to said arms and adjacent thereto, one of said hook ends removably secured to one of said surfaces, the other of said surfaces having two substantially parallel grooves formed therein, the other of said hook ends located in one of said grooves, and manually operable means extending from said clamp for deforming said clamp within its elastic limit and moving said other hook end to the other of said grooves.
2. The device of claim 1, wherein said manually oper- able means comprise a tab integrally formed with one of said arms adjacent the other of said hook ends.

3. The device of claim 1, wherein said one surface has a groove formed therein, said one hook end extending into said groove.

4. The device of claim 1, wherein said mirror is wedge shaped.

5. A rear view mirror assembly comprising a mirror, a clamp, said mirror secured to said clamp, said clamp including a main body and a pair of resilient hook arms extending substantially perpendicularly from said main body at opposite ends thereof so that said clamp is C-shaped, a mounting member extending between said arms, one of said arms removably secured to said member, said member having a pair of spaced recesses formed therein, manually operable means for deforming said arms within their elastic limit and moving the other of said arms from one of said grooves to the other.

6. The device of claim 5 wherein said mirror is wedge shaped.

7. The device of claim 6 wherein said manually operable means comprises a tab integrally formed with and extending from said other arm substantially parallel to said main body.

8. A rear view mirror assembly comprising a spring clamp having an elongated side and a pair of prongs extending normal to said side, each of said prongs located at one extremity of said side, and having a hook end remote from said side, a mirror, means securing said mirror to said side for movement therewith, an elongate mounting member having a top surface and a bottom surface, said surfaces oriented substantially perpendicular to said side, said top surface having a groove therein, one of said prongs extending into said groove, said bottom surface having a pair of generally parallel grooves formed therein, the other of said prongs extending into one of said bottom grooves, and manually operable means on said other prong for moving said other prong from one of said bottom grooves to the other.

References Cited

UNITED STATES PATENTS

| | | | |
|---|---|---|---|
| 1,575,963 | 3/1926 | Bispham | 248—478 |
| 1,595,844 | 8/1926 | Winter | 248—226.5 |
| 1,586,173 | 5/1926 | Aderente | 248—226.1 |
| 2,910,915 | 11/1959 | Harris | 350—280 |
| 2,913,958 | 11/1959 | Mead et al. | 350—281 |
| 3,019,954 | 2/1962 | Faltin | 248—316.5 |
| 3,176,950 | 4/1965 | Hittesdorf | 248—226.5 |

DAVID SCHONBERG, *Primary Examiner.*

PAUL R. GILLIAM, *Assistant Examiner.*

U.S. Cl. X.R.

248—226, 316